(12) United States Patent
Sandstrom et al.

(10) Patent No.: US 7,670,448 B2
(45) Date of Patent: *Mar. 2, 2010

(54) VEHICLE WHEEL MADE WITH PRECURED AND FOAMED ELASTOMERIC MATERIAL AND METHOD

(75) Inventors: Paul Harry Sandstrom, Cuyahoga Falls, OH (US); Robert Anthony Neubauer, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 684 days.

This patent is subject to a terminal disclaimer.

(21) Appl. No.: 11/224,461

(22) Filed: Sep. 12, 2005

(65) Prior Publication Data

US 2007/0056669 A1    Mar. 15, 2007

(51) Int. Cl.
*B29D 30/00* (2006.01)
*B29D 30/04* (2006.01)

(52) U.S. Cl. ............... 156/110.1; 156/112; 156/113

(58) Field of Classification Search .......... 152/155, 152/157, 158, 195, 196, 246, 310, 311, 312, 152/313, 516, 520; 156/110.1, 112, 113
See application file for complete search history.

(56) References Cited

U.S. PATENT DOCUMENTS

| | | | |
|---|---|---|---|
| 1,097,824 A * | 5/1914 | Staten | 152/318 |
| 3,022,810 A | 2/1962 | Lambe | |
| 3,381,735 A | 5/1968 | Talcott et al. | |
| 3,650,865 A | 3/1972 | Hawkes et al. | |
| 3,866,652 A * | 2/1975 | Ahmad | 152/317 |
| 3,872,201 A | 3/1975 | Paul et al. | |
| 4,060,578 A | 11/1977 | Kisbany | |
| 6,568,443 B2 | 5/2003 | Shoner | |
| 6,623,580 B2 | 9/2003 | McMahon et al. | |
| 6,779,572 B2 | 8/2004 | Tabor et al. | |

FOREIGN PATENT DOCUMENTS

| | | | |
|---|---|---|---|
| JP | 57058501 | * | 4/1982 |
| JP | 2004358805 | * | 12/2004 |

* cited by examiner

*Primary Examiner*—Justin Fischer
(74) *Attorney, Agent, or Firm*—Wood, Herron & Evans, LLP (57) ABSTRACT

A vehicle wheel having a tire mounted on a wheel rim with a precured and foamed elastomeric material in a closed cavity in the tire and a polyurethane formed in the closed cavity around the precured and foamed elastomeric material.

10 Claims, 9 Drawing Sheets

VEHICLE WHEEL MADE WITH PRECURED AND FOAMED ELASTOMERIC MATERIAL AND METHOD

CROSS REFERENCES TO RELATED APPLICATIONS

This application is related to U.S. patent application Ser. No. 11/159,953 filed on Jun. 23, 2005 by George F. Balogh et al. and entitled TIRE CONTAINING CELLULAR RUBBER WITHIN ITS TIRE CAVITY, the entirety of which is hereby incorporated by reference herein.

This application is further related to a U.S. patent application filed on even date herewith by Paul H. Sandstrom and entitled TIRE FILLED WITH RECYCLED AND CURABLE ELASTOMERIC MATERIAL AND METHOD, the entirety of which is hereby incorporated by reference herein.

This application is further related to a U.S. patent application filed on even date herewith by Paul H. Sandstrom et al. and entitled TIRE FILLED WITH CORE AND CURABLE ELASTOMERIC MATERIAL AND METHOD, the entirety of which is hereby incorporated by reference herein.

FIELD OF THE INVENTION

This invention relates generally to vehicle wheels and more particularly, to vehicle wheels filled with a foamed elastomeric material and polyurethane.

BACKGROUND OF THE INVENTION

Vehicle wheels with foam filled tires are especially useful in applications involving industrial and off-the-road vehicles, where it is essential to maintain the vehicles in service, since time lost for repairs is very costly. It is known to fill tires with a curable and foamable elastomeric material, which, after heat curing, expands to a closed cell foam rubber composition that provides an operating pressure within the tire. Such foam filled tires are substantially deflation proof and almost indestructible from normal hazards, for example, bolts, nails, large holes, jagged curbs, sharp rocks, deep water, etc. Thus, foam filled tires substantially reduce the time such vehicles are down for repairs.

Examples of filled tires are shown and described in U.S. Pat. Nos. 3,022,810, 3,381,735, 3,650,865, 3,872,201, 4,060,578 and 6,623,580. U.S. Pat. No. 3,650,865 provides one example of filling a tire cavity with a curable and foamable elastomeric material to pressurize the tire. U.S. Pat. Nos. 3,650,865 and 6,623,580 describe methods of making a foam filled tire by inserting layers of a curable and foamable elastomeric material within a cured tire. The tire is then heated to cure the curable and foamable elastomeric material contained therein. The heat curing process can be performed either before, or after, the tire is mounted on a wheel rim. Heating causes the layers of the curable and foamable elastomeric material to expand and form a closed cell foam rubber composition that provides an internal tire pressure.

Tires filled with such a curable and foamable elastomeric material have a damping similar to that of a pneumatic tire and thus, provide a pneumatic-like ride, which is especially important with unsprung off-the-road vehicles. Further, the performance of such foam filled tires is often superior to the performance of tires filled with other materials. To achieve greater market acceptance, it is desirable that tire dealers be able to manufacture foam filled tires with an elastomeric material. However, many tire dealers do not have heat curing equipment. Further, the cost of such equipment and the time and energy required for the heat curing process add substantial costs to a foam filled tire made with an elastomeric material.

To avoid such costs, tire dealers often make vehicle wheels using alternative materials, for example, polyurethane. With such a process, after mounting a cured tire on a wheel rim, the tire is often prestretched for about 24 hours. Materials forming a polyurethane or a similar polymer are then injected into a tire cavity through a check valve in the wheel rim that is located in a lower-most six o'clock position. Air is vented from the tire cavity through a bleed or vent hole extending through the tread at an upper-most twelve o'clock position. The injected materials react to form a polyurethane that fills the cavity inside the tire.

A polyurethane filled wheel has several disadvantages compared to a wheel filled with a cured and foamed elastomeric material. First, the polyurethane fill provides little or no dampening and thus, gives a harsher ride, which increases vehicle wear and tear, as well as operator fatigue. Further, the polyurethane is a very hard fill material that provides a smaller tire footprint. Thus, the polyurethane filled tire has a greater ground pressure that may breakup the ground surface. In addition, the smaller footprint provides less tire traction.

Therefore, there is a need for an improved foam filled tire and method of manufacture that reduces the cost of making a tire filled with a closed cell foam rubber composition.

SUMMARY OF THE INVENTION

The present invention provides a vehicle wheel with a tire filled with an elastomeric material, which is substantially less expensive to make and provides a ride that is less harsh than polyurethane filled tires. The vehicle wheel of the present invention uses a precured elastomeric material in combination with polyurethane. Hence, the step of heat curing an elastomeric material inside the tire is eliminated, thereby eliminating a substantial cost in manufacturing the wheel. Therefore, the vehicle wheel of the present invention is especially useful in the manufacture of industrial and off-the-road vehicle foam filled wheels by a tire dealer.

More specifically, in a first embodiment, the invention provides a vehicle wheel that has a wheel rim, a tire mounted on the wheel rim, a precured and foamed elastomeric material in a closed cavity in the tire and a polyurethane formed in the closed cavity and filling space around the precured and foamed elastomeric material. In one aspect of the invention, the polyurethane is formed by injecting two polyurethane-forming liquids into the tire cavity through a check valve in the wheel rim.

In another aspect of the invention, the precured and foamed elastomeric material can be in the form of strips of elastomeric material that extend in a circumferential direction with respect to a tire centerline, discs of elastomeric material that are substantially perpendicular to the tire centerline or radial slices of elastomeric material that are positioned circumferentially with respect to the tire centerline.

In another embodiment, the invention provides a method of filling a cured tire by first placing a precured and foamed elastomeric material inside a cavity of the cured tire and then, mounting the tire on a wheel rim to form a closed cavity with the wheel rim. Thereafter, space in the closed cavity around the precured and foamed elastomeric material is filled with materials forming a polyurethane.

These and other objects and advantages of the present invention will become more readily apparent during the following detailed description taken in conjunction with the drawings herein.

DEFINITIONS

"Elastomeric material" means a generally elastic, heat curable material that has a rubber or synthetic rubber base, which upon curing, provides a closed cell foam rubber composition, for example, a PERMAFOAM elastomeric material commercially available from The Goodyear Tire and Rubber Company.

"Cured and foamed elastomeric material" means a closed cell foam rubber composition produced by curing an elastomeric material in a cavity of a cured tire.

"Precured and foamed elastomeric material" means a closed cell foam rubber composition produced by curing an elastomeric material outside a cured tire.

"Foam filled tire" means a tire having an interior cavity filled with at least a closed cell foam rubber composition produced by curing an elastomeric material.

DETAILED DESCRIPTION OF THE INVENTION

Figure 1:
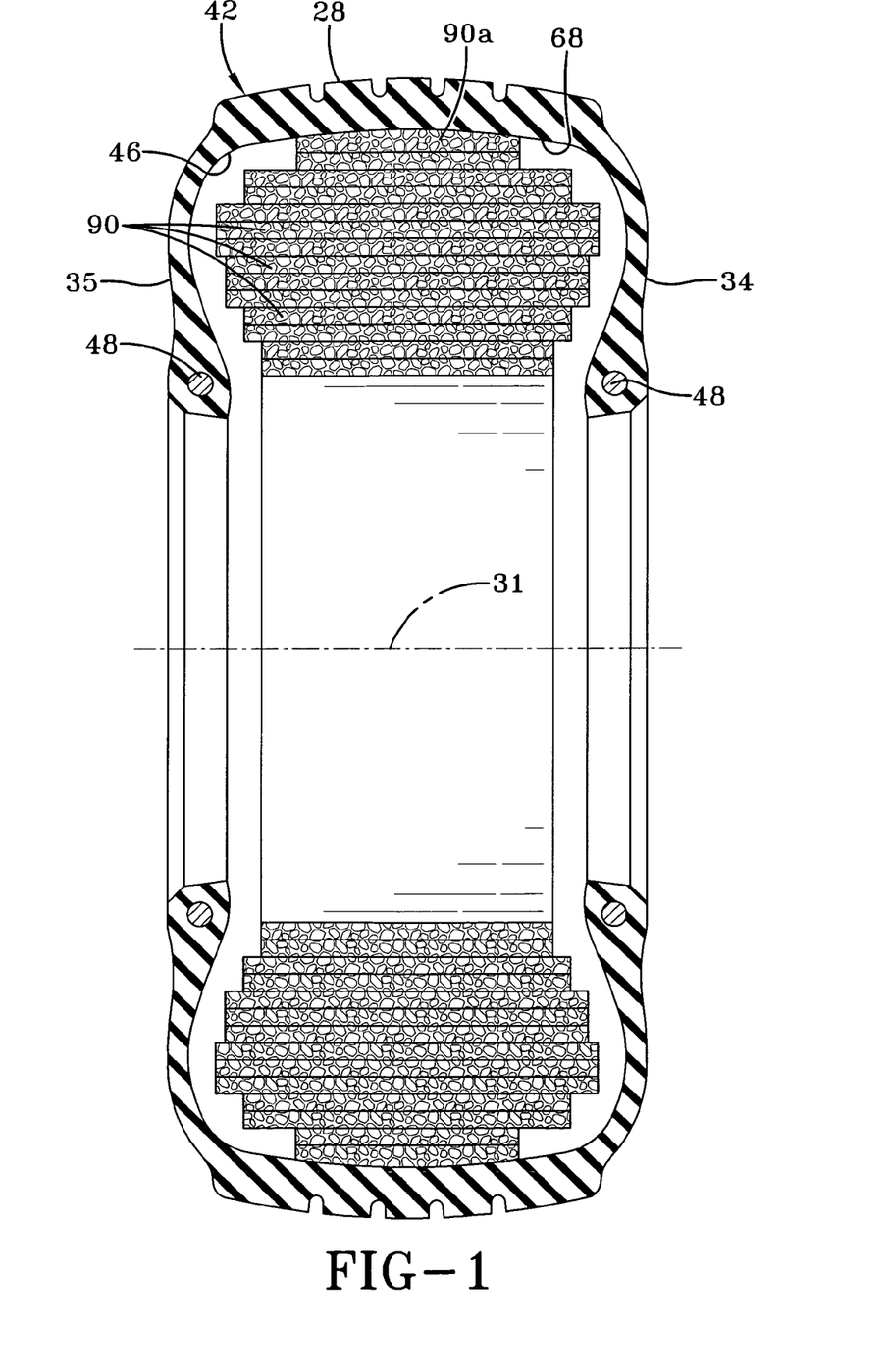
FIG. 1 is a cross-sectional view of a first embodiment of a cured tire that contains a precured and foamed elastomeric material in accordance with the principles of the present invention.

Referring to FIG. 1, pieces of precured and foamed elastomeric material 90 are placed in a circumferential direction inside a generally toroidal shaped open cavity 46 of a cured tire 42. The precured and foamed elastomeric material 90 may be cut or formed into strips that vary in thickness and width depending on the size of the tire 42. For example, the strips may vary in thickness in a range of from about 0.5 cm (about 0.2 inch) to about 2.5 cm (about 1 inch) thick. However, strips of greater thickness, for example, about 5-61 cm (about 2-24 inches), are more practical for large earth-mover tires. Typically, the thickness of the strips is relatively thin compared to the depth of the cavity 46, such that a number of layers are required to fill the open cavity 46.

The successive layers of precured and foamed elastomeric material 90 may be equal or unequal in thickness and width; and if further material is needed, a separate compensator strip can be used. The number of layers of precured and foamed elastomeric material 90 is essentially application dependent and is initially determined experimentally on a tire-by-tire basis. Thus, the precured and foamed elastomeric material 90 is cut into lengths that can be readily handled and used depending on the nature of the insertion and layering process. In some applications, the layers of precured and foamed elastomeric material 90 can be bonded or otherwise joined or tied together; and in other applications, an innermost layer of precured and foamed elastomeric material 90a can be bonded or otherwise joined to an inner surface 68 of the tire casing below the tread 28.

In a known manner, the tire 42 can be fixtured with clamps (not shown) that hook over, and spread, beads 48 to provide greater access to the tire open cavity 46. Further, as is known, after several layers of the precured and foamed elastomeric material 90 have been applied, they can be compressed in a radially outward direction utilizing a pneumatic inner tube (not shown) or other compression device.

Figure 2:
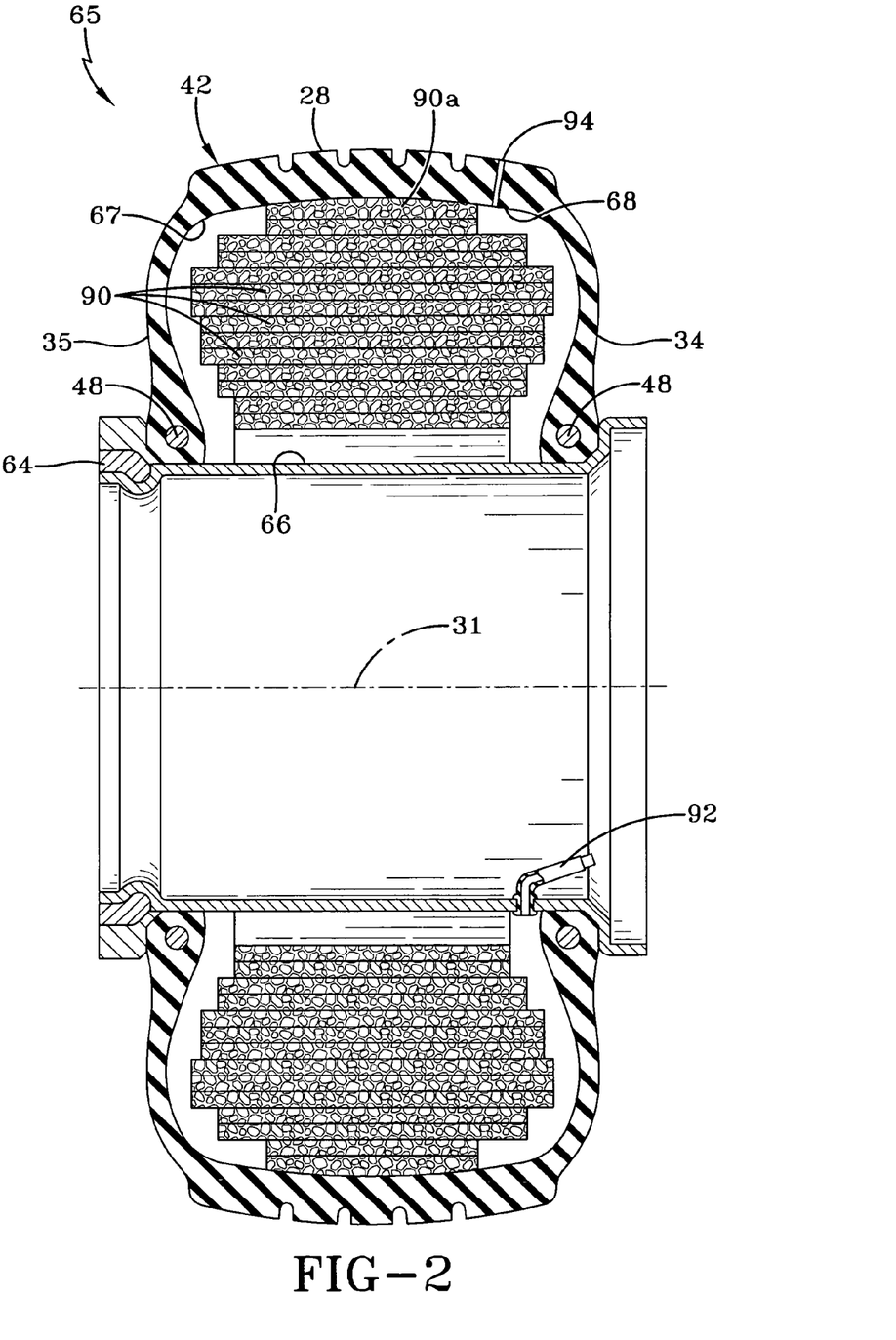
FIG. 2 is a cross-sectional view of the tire of FIG. 1 mounted on a wheel rim.
Figure 3:
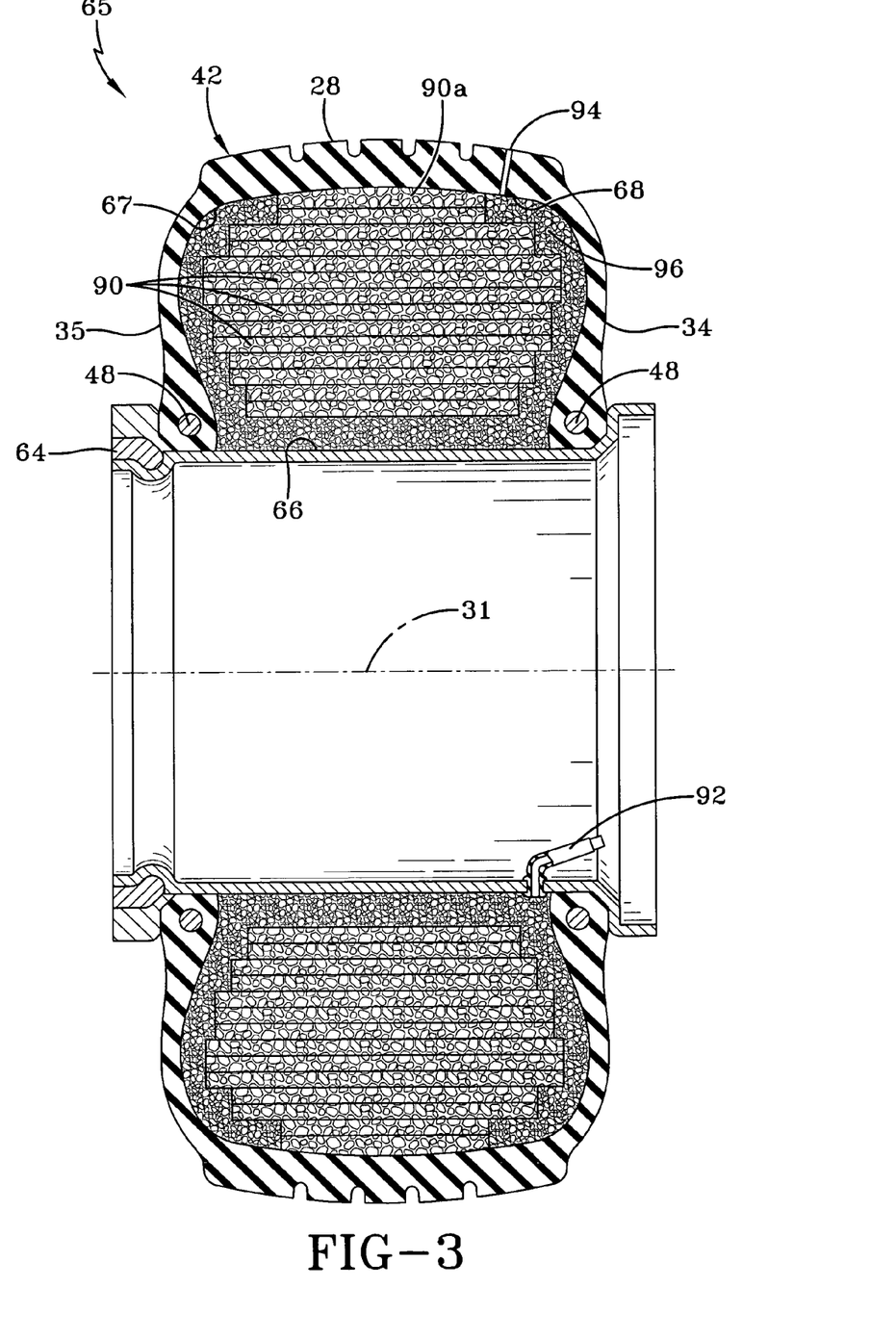
FIG. 3 is a cross-sectional view of the mounted tire of FIG. 2 with substantially all spaces around the precured and foamed elastomeric material filled with a polyurethane.

Referring to FIG. 2, the cured tire 42, with the strips of precured and foamed elastomeric material 90 therein, is assembled or mounted onto a wheel rim 64 to form a vehicle tire 65. A closed cavity 67 is formed by an external circumferential surface 66 of the wheel rim 64 extending between sidewalls 34, 35 of the cured tire 42. The wheel rim 64 has a known check valve 92 positioned at about a lower-most, six o'clock position. A small bleed or vent hole 94 is made at about an upper-most, twelve o'clock position, and the hole 94 extends through a tire tread 28 and casing 22 and intersects the closed cavity 67. In a known manner, liquids forming a polyurethane are injected into the cavity 67 through the check valve 92, either separately or as a blend. The liquids flow into spaces and voids around the precured and foamed elastomeric material 90 in the cavity 67. As shown in FIG. 3, the liquids react to form a polyurethane 96, which with the precured and foamed elastomeric material 90, substantially fills the closed cavity 67. In an alternative process, the mounted tire 42 may be stretched prior to filling it with the precured and foamed elastomeric material 90 or prior to injecting the polyurethane forming liquids.

Figure 4:
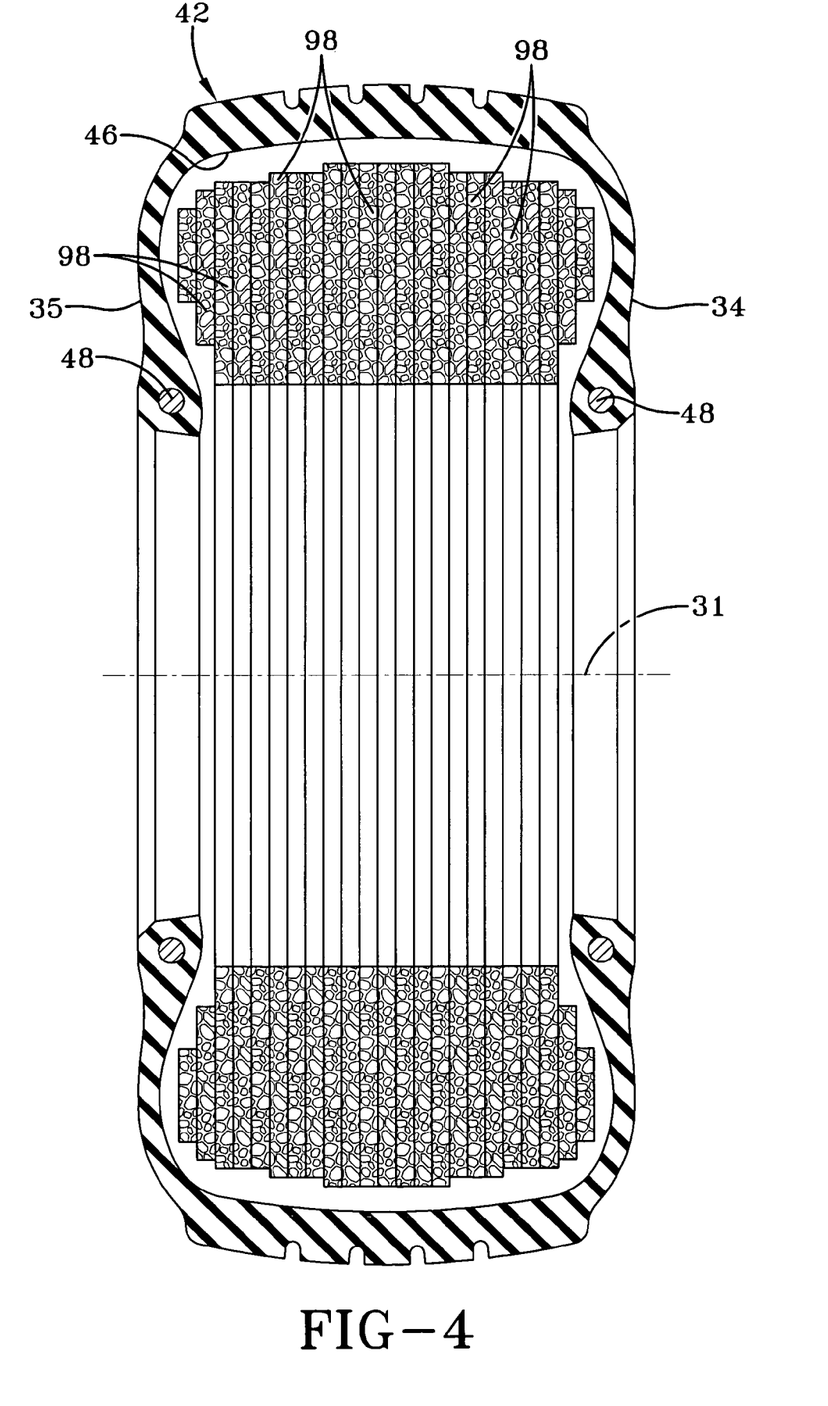
FIG. 4 is a cross-sectional view of another embodiment of a cured tire filled with discs of a precured and foamed elastomeric material in accordance with the principles of the present invention.

In the embodiment of FIGS. 1-3, the layers of precured and foamed elastomeric material 90 are positioned in a circumferential direction inside the cured tire 42. In an alternative embodiment shown in FIG. 4, discs of precured and foamed elastomeric material 98 may be used to fill the open cavity 46. The precured and foamed elastomeric material discs 98 are cut to thicknesses that permit them to be bent and manipulated, so that they can be placed inside the open cavity 46 in a direction generally perpendicular to a tire centerline 31. Alternately, the discs of precured and foamed elastomeric material 98 may be cut thicker and segmented, so that they can be readily placed inside the open cavity 46. In some applications, the discs of precured and foamed elastomeric material 90 can be bonded or otherwise joined or tied together; and in other applications, the discs of precured and foamed elastomeric material 90 can be bonded or otherwise joined to an inner surface of the open cavity 46.

Figure 5:
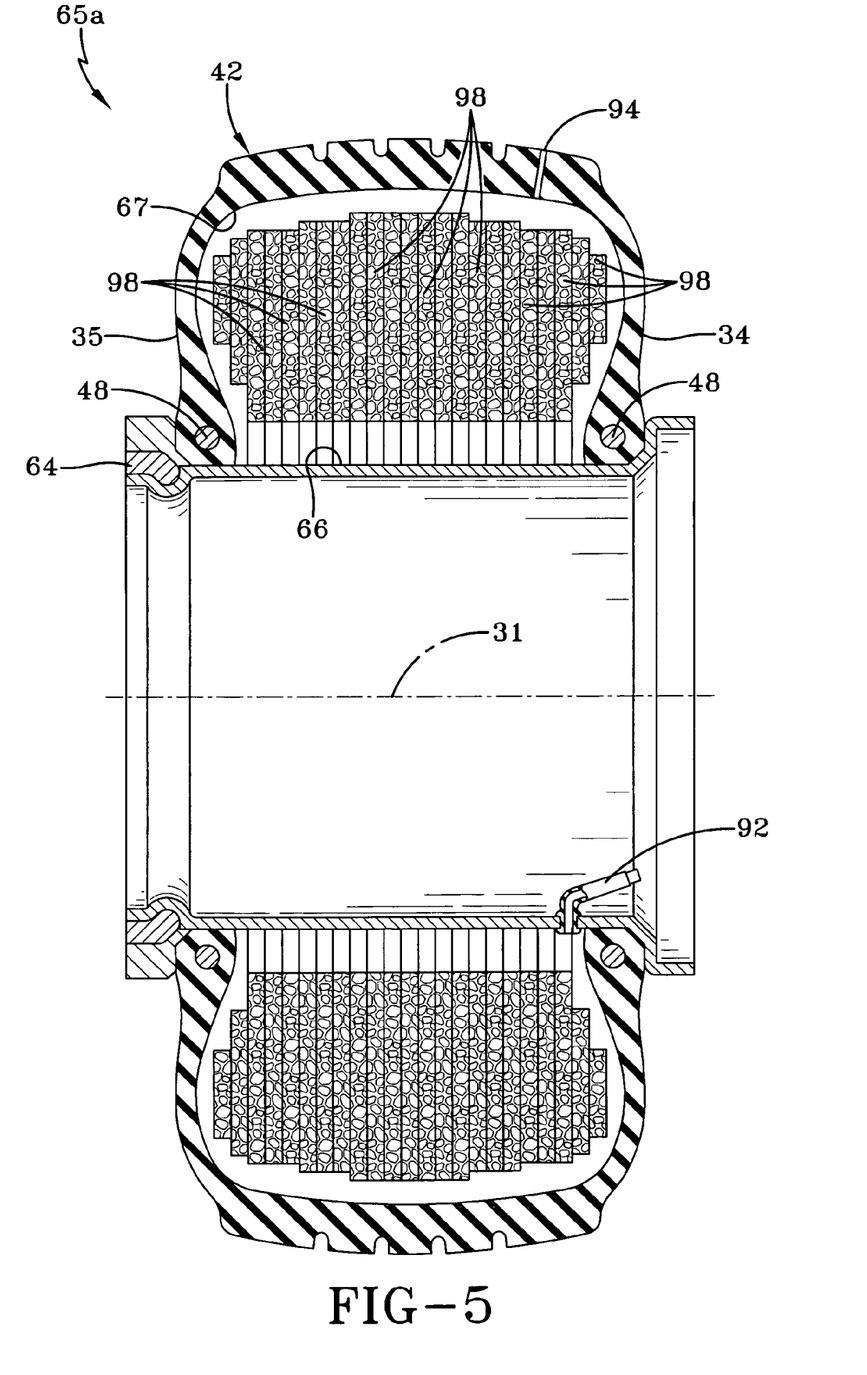
FIG. 5 is a cross-sectional view of the tire of FIG. 4 mounted on a wheel rim.
Figure 6:
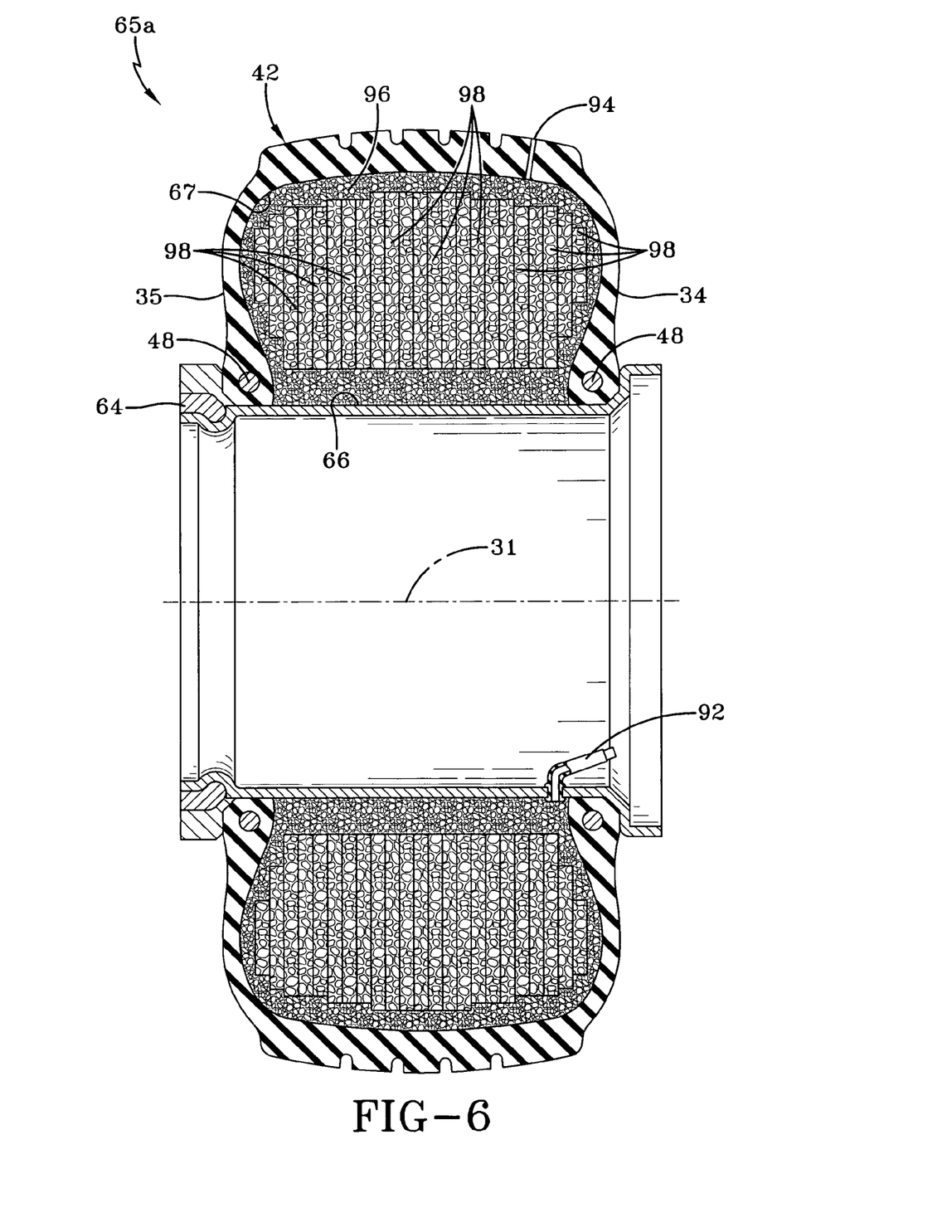
FIG. 6 is a cross-sectional view of the mounted tire of FIG. 5 filled with a polyurethane.

Referring to FIG. 5, a vehicle tire 65a is assembled by mounting the cured tire 42, with the discs of precured and foamed elastomeric material 98 therein, onto a wheel rim 64, thereby forming a closed cavity 67. A check valve 92 is positioned at about a lower-most, six o'clock position, and a small hole 94 extends through a tire tread 28 and casing 46 and intersects the closed cavity 67. In a known manner, liquids forming a polyurethane are injected into the cavity 67 through the check valve 92. The liquids flow into spaces and voids in the cavity 67 and as shown in FIG. 6, react to form a polyurethane 96, which substantially fills the closed cavity 67 around the precured and foamed elastomeric material 98. In an alternative process, the mounted tire 42 may be stretched prior to filling it with the precured and foamed elastomeric material 98 or prior to injecting the polyurethane forming liquids.

Figure 7:
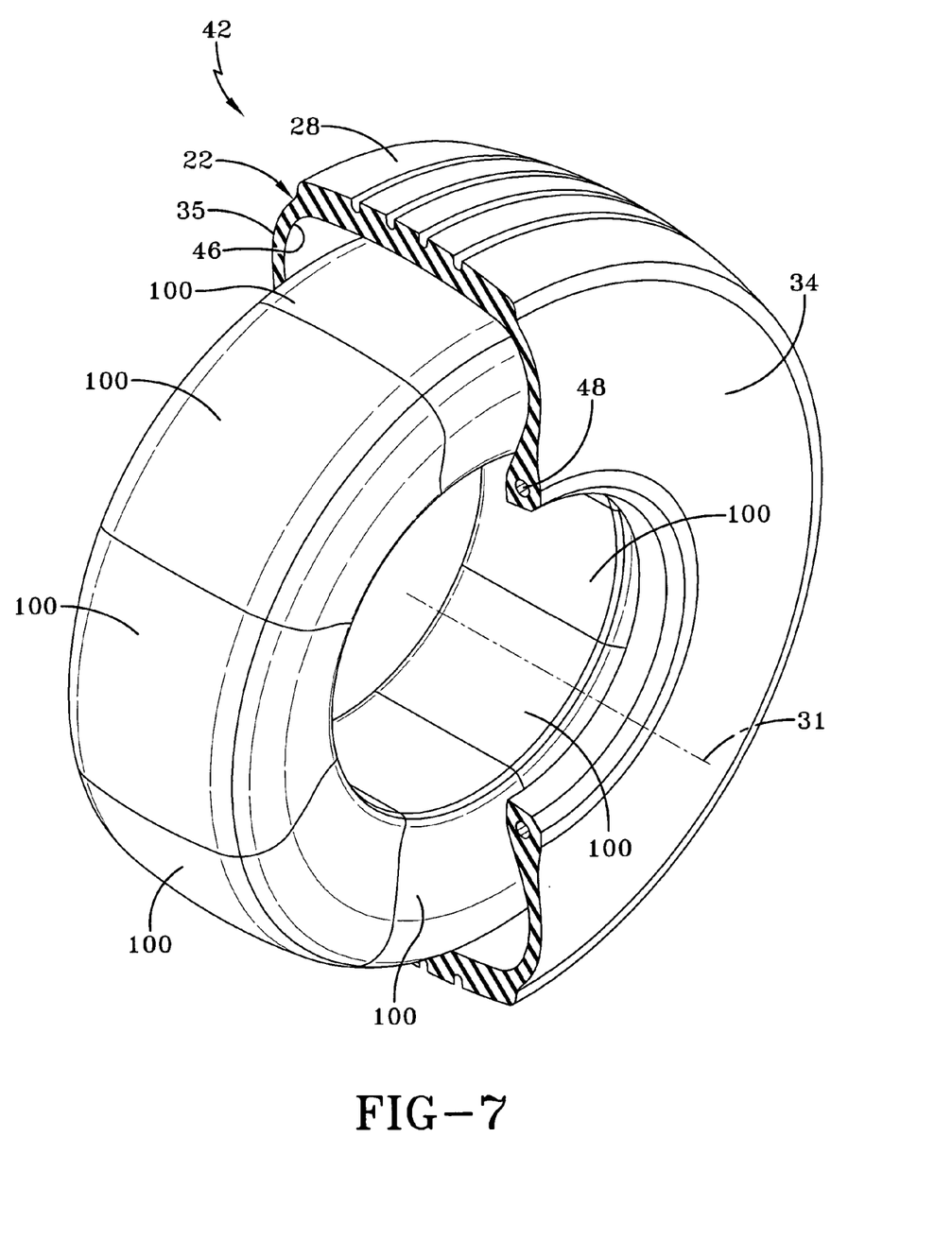
FIG. 7 is a cross-sectional view of another embodiment of a cured tire filled with segments of a precured and foamed elastomeric material in accordance with the principles of the present invention.
Figure 8:
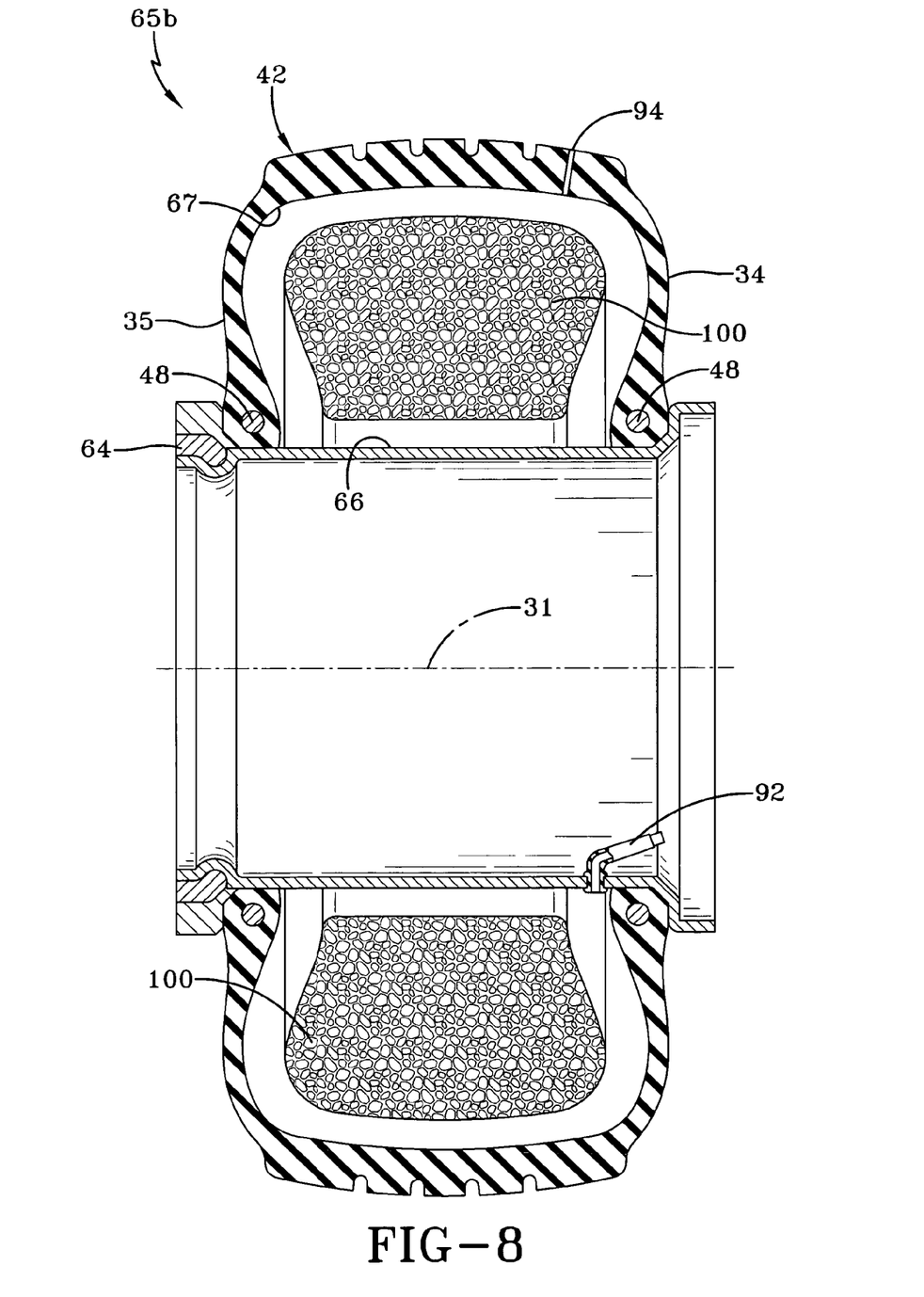
FIG. 8 is a cross-sectional view of the tire of FIG. 7 mounted on a wheel rim.
Figure 9:
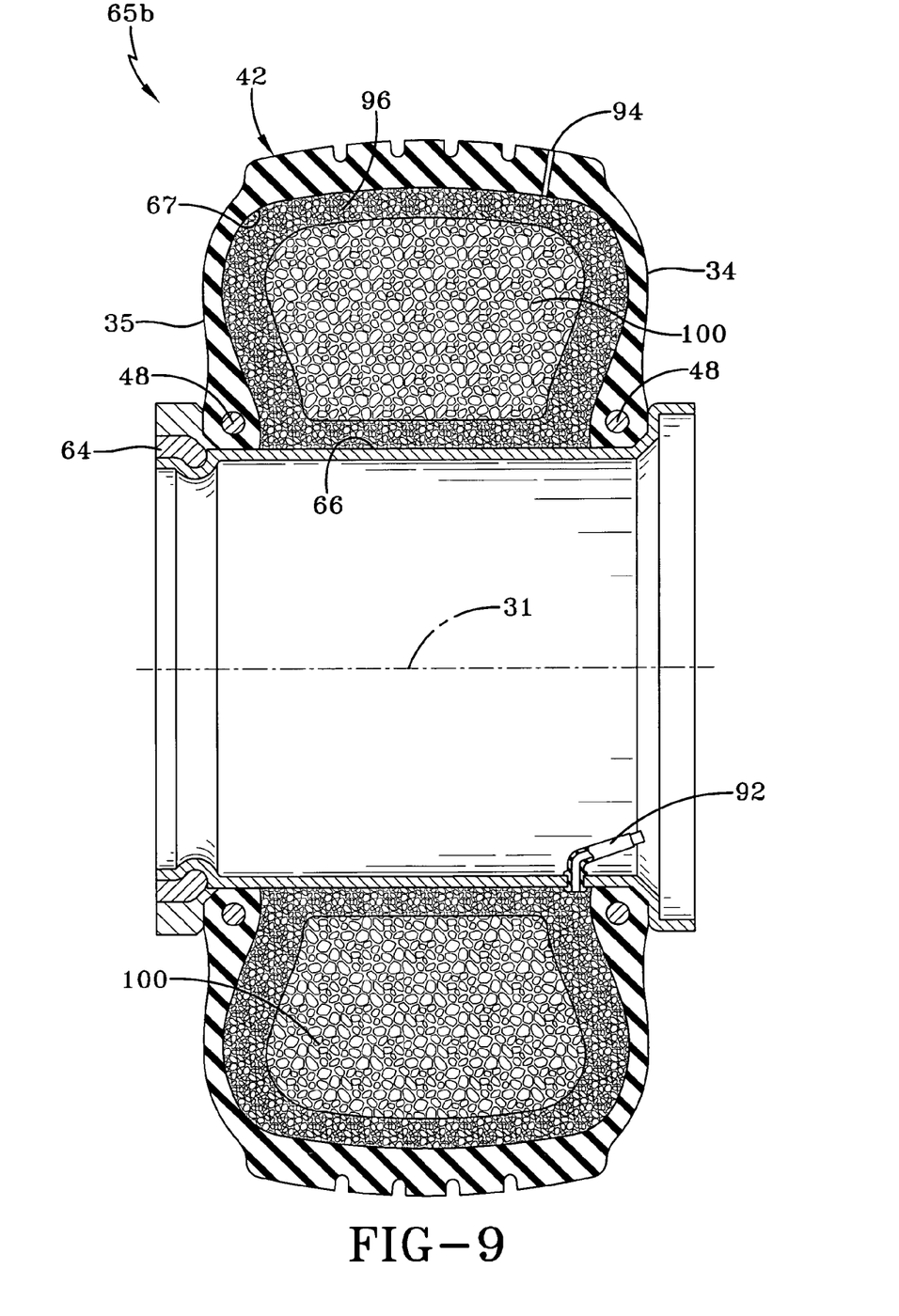
FIG. 9 is a cross-sectional view of the mounted tire of FIG. 8 filled with a polyurethane.

In a further embodiment shown in FIG. 7, segments of precured and foamed elastomeric material 100 may be used to fill the open cavity 46. The precured and foamed elastomeric material segments 100 are cut to thicknesses that permits them to be located into the centerhole of the tire 42 and inserted between the sidewalls 34, 35 of the casing 22. Referring to FIG. 8, a vehicle tire 65b is assembled by mounting the cured tire 42, with the segments of precured and foamed elastomeric material 100 therein, onto a wheel rim 64, thereby forming the closed cavity 67. A check valve 92 is positioned at about a lower-most, six o'clock position, and a small hole 94 extends through a tire tread 28 and casing 46 and intersects the closed cavity 67. In a known manner, liquids forming a polyurethane are injected into the cavity 67 through the check valve 92. The liquids flow into spaces and voids in the cavity 67 and as shown in FIG. 9, react to form a polyurethane 96, which substantially fills the closed cavity 67 around the precured and foamed elastomeric material 100. In an alternative process, the mounted tire 42 may be stretched prior to filling it with the precured and foamed elastomeric material segments 100 or prior to injecting the polyurethane 96.

In the various embodiments, the precured and foamed elastomeric materials 90, 98, 100 may be a new material that has been made and sold by a supplier for use as a foam fill for a cured tire. Alternatively, the precured and foamed elastomeric materials 90, 98, 100 may be a cured and foamed elastomeric material that has been recovered from a used tire and recycled by reforming it into strips, discs, segments or other shapes. In other examples, other tires filled with a cured and foamed elastomer composition may be used, for example, tires that fail a quality inspection because of a manufacturing defect, or tires that have been returned to a manufacturer prior to the end of their useful life but cannot be resold, etc.

The finished vehicle wheel 65, 65a, 65b has numerous advantages. First, it can be manufactured by a tire dealer without incurring the costs of purchasing and operating special curing equipment. Second, precured and foamed elastomeric material may be supplied in different forms depending on the application needs of the tire dealer. Third, the filling of the tire with liquids forming a polyurethane is a known process that is relatively inexpensive and also easy for the tire dealer to handle and use. Fourth, the finished vehicle wheel filled with the precured and foamed elastomeric material has a damping similar to that of a pneumatic tire and thus, provides a pneumatic-like ride, which is especially important with unsprung off-the-road vehicles. Thus, vehicle wheels filled with a closed cell foam rubber composition can be made by tire dealers for substantially less cost than with known methods.

While the present invention has been illustrated by a description of various embodiments and while these embodiments have been described in considerable detail, it is not the intention of Applicants to restrict or in any way limit the scope of the appended claims to such detail. Additional advantages and modifications will readily appear to those skilled in the art. For example, in an alternative embodiment, the precured and foamed elastomeric material is cut, chopped or ground into particles of precured and foamed material that are mixed with one or both of the liquids that react to form the polyurethane. The liquids including the precured and foamed particles are automatically or manually injected, via a check valve or other means, into a closed cavity formed by mounting a cured tire on a wheel rim. The liquids react to form a polyurethane with the precured and foamed particles dispersed therein. The relative quantities of precured and foamed elastomeric material particles and the liquids forming the polyurethane are application dependent and determined experimentally on a tire-by-tire basis.

Further, in the described embodiments, the various layers or pieces of curable and foamable elastomeric material are shown abutted against each other, without any spacing. It should be noted that the drawings are schematic in nature; and in practice, adjacent layers or pieces of elastomeric material may have spaces between them. Further, the various embodiments illustrate the pieces and layers of elastomeric material with a particular orientation with respect to the tire centerline. However, again, in practice, precise orientations of the pieces and layers of elastomeric material are not required; and the pieces and layers of elastomeric material may have an oblique orientation with the tire centerline.

Therefore, the invention in its broadest aspects is not limited to the specific details shown and described. Consequently, departures may be made from the details described herein without departing from the spirit and scope of the claims which follow.

What is claimed is:

1. A method of assembling a vehicle wheel comprising:
    placing at least one piece of precured and foamed elastomeric material inside a cavity of a cured tire;
    mounting the tire with the at least one piece of precured and foamed elastomeric material on a wheel rim to form a closed cavity with the wheel rim;
    filling space in the closed cavity around the at least one piece of precured and foamed elastomeric material with liquids forming a polyurethane; and
    reacting the liquids in the closed cavity to form polyurethane without applying additional heat to the tire,
    wherein the at least one piece of precured and foamed elastomeric material comprises strips of precured and foamed elastomeric material positionable inside the cavity in a circumferential direction about a tire centerline, discs of precured and foamed elastomeric material positionable inside the cavity in a direction generally perpendicular to the tire centerline, circumferential segments of precured and foamed elastomeric material, or particles of precured and foamed elastomeric material or a combination thereof.

2. The method of claim 1 wherein filling the closed cavity further comprises injecting the liquids forming a polyurethane through a check valve in the wheel rim.

3. The method of claim 1 further comprising bleeding air through a wall of the tire simultaneously with filling the closed cavity with the liquids forming a polyurethane.

4. The method of claim 1 further comprising bonding the at least one piece of precured and foamed elastomeric material to a surface of the cavity.

5. The method of claim 1 further comprising bonding the at least one piece of precured and foamed elastomeric material to a surface of the cavity immediately below a tread of the tire.

6. A method of assembling a vehicle wheel comprising:
    placing at least one piece of precured and foamed elastomeric material inside a cavity of a cured tire;
    mounting the tire with the at least one piece of precured and foamed elastomeric material on a wheel rim to form a closed cavity with the wheel rim;
    filling space in the closed cavity around the at least one piece of precured and foamed elastomeric material with liquids forming a polyurethane; and
    reacting the liquids in the closed cavity to form polyurethane without applying additional heat to the tire, wherein placing at least one piece of precured and foamed elastomeric material further comprises:
placing pieces of precured and foamed elastomeric material inside the cavity of the tire; and
bonding the pieces of the precured and foamed elastomeric material together.

7. The method of claim 6 wherein filling the closed cavity further comprises injecting the liquids forming a polyurethane through a check valve in the wheel rim.

8. The method of claim 6 further comprising bleeding air through a wall of the tire simultaneously with filling the closed cavity with the liquids forming a polyurethane.

9. The method of claim 6 further comprising bonding the at least one piece of precured and foamed elastomeric material to a surface of the cavity.

10. The method of claim 6 further comprising bonding the at least one piece of precured and foamed elastomeric material to a surface of the cavity immediately below a tread of the tire.

* * * * *